United States Patent [19]

Vogel

[11] 3,906,233

[45] Sept. 16, 1975

[54] SYSTEM AND METHOD FOR ADMINISTERING RADIATION

[75] Inventor: Thomas M. Vogel, Sunnyvale, Calif.

[73] Assignee: Varian Associates, Palo Alto, Calif.

[22] Filed: Oct. 12, 1973

[21] Appl. No.: 406,080

[52] U.S. Cl. .............................. 250/355; 250/354
[51] Int. Cl. ............................................. G01t 1/17
[58] Field of Search ................ 250/354, 355, 445 T

[56] References Cited
UNITED STATES PATENTS

| | | | |
|---|---|---|---|
| 3,334,231 | 8/1967 | Bernstein | 250/355 |
| 3,499,152 | 3/1970 | Hetenhouser | 250/354 X |
| 3,675,019 | 7/1972 | Hill et al. | 250/355 X |

*Primary Examiner*—Archie R. Borchelt
*Attorney, Agent, or Firm*—Stanley Z. Cole; Leon F. Herbert; Edward J. Radlo

[57] ABSTRACT

A system and method for metering the quantity of radiation administered a subject by a source of radiation movable along a path relative to the subject. The system cumulatively counts the amount of radiation directed toward the subject during each of a succession of increments of motion of the source. When a predetermined amount of radiation is delivered during an increment, the source is disabled until the source passes into the next increment of displacement. The count of radiation is restarted at the instant the source is disabled, to accumulate accurately any added spurious radiation dosage which may occur and to include that dosage in the count of the permitted amount for the next succeeding increment of motion. Several interlocks for disabling the system in response to various malfunctions are included. Means for controlling the speed of movement of the source and/or the dose rate of the source are also included.

33 Claims, 4 Drawing Figures

FIG. I

SYSTEM AND METHOD FOR ADMINISTERING RADIATION

BACKGROUND OF THE INVENTION

1. Field of the Invention

This invention relates to the field of apparatus and method for controlledly irradiating a subject. More particularly, the invention pertains to administering a predetermined maximum dose of radiation during each of several increments of relative motion of the radiation source relative to the subject.

2. Description of Prior Art

It is known to irradiate a subject by relatively moving a source of radiation about the subject along a path. A benefit of this method of delivering radiation is that the radiation may be focused upon a "target" area which will be constantly irradiated during the movement of the source. The surrounding areas, however, receive only a portion of the radiation dosage which is delivered to the target. This technique has utility in therapeutic applications where it is generally desirable to apply a high dosage of radiation to a target organ or part of the body, and where it is desirable as well to restrict as much as possible the radiation delivered to surrounding tissues.

The normal way of administering radiation according to the above limitations is to position the patient or subject on a stationary object, while moving the radiation source along a circular path surrounding the target region. The source of radiation is preset to emit the radiation at a known rate. The length of the path or arc traversed by the source is predetermined, as is the velocity with which the source moves. These variables together determine the dosage ultimately administered to the target area.

Several difficulties, however, are commonly experienced in the execution of this technique. First, it is often difficult to govern with the desired accuracy the velocity of the source. Radiation sources are commonly very massive components, and apparatus to govern their motion generally involves the use of counterweights, which counterweights may not be perfectly balanced, thus imparting variations in speed of the entire combination. Other factors, such as bearing malfunction may also exert an undesirable influence.

Moreover, it is not always possible to regulate the rate at which the source emits radiation with the desired precision. Such factors as line voltage variations, which are difficult to detect and eliminate, can substantially affect the output of the source.

It sometimes occurs in the operation of such radiation systems that spurious radiation may be emitted by the source. The dangers and complications of such emissions are clear.

Furthermore, certain other basic malfunctions of the system may arise which render its operation ineffective or deleterious. For example, the velocity of the source may be so low as to severely overexpose a portion of the target area to radiation. Also, the output of the source may for any of a number of reasons drop below an effective value, notwithstanding that the source may remain operable to some degree.

Consequently, it is a major object of this invention to provide a method and system for controlling the amount of radiation incident onto a target, while compensating for the unwanted variations and irregularities noted above.

It is another object of the invention to provide a method and system having sufficient flexibility to compensate for variations in radiation which tend to result from imprecise control of source velocity and of intensity of radiation from the source.

It is a further object to provide a system and method in which the path of motion of the source is divided into a plurality of increments, and the radiation emanating from the source is regulated to a predetermined maximum value during the traversal by the source of each of the increments of motion.

It is a further object of this invention to provide a system and method according to the above description in which the existence of any spurious radiation from the source is taken into account in establishing the aforementioned maximum dosage for each increment of motion.

It is an additional object of this invention to provide a method and system whereby, notwithstanding the potential irregularity of radiation resulting from the nonuniformity of source velocity and radiation output, the radiation is administered to the subject in a substantially uniform fashion throughout the movement of the source along its predetermined path.

It is another object to provide a system and apparatus for providing an indication when the dosage delivered during any increment of motion of the source falls below a predetermined level.

It is still another object to provide a system and apparatus for producing an indication when the speed at which the source traverses any increment of motion falls below a predetermined value.

It is a further object to provide a system and apparatus for providing an indication if the dosages delivered during any increment of motion is significantly greater then the desired dosage.

It is a another object to provide a system and apparatus for providing an indication of an unacceptable amount of radiation during the time the source is intended to be inactivated.

It is an additional object to provide a system and apparatus which includes flexibility in selecting different speeds of movement of the source and/or different dose rates of the source.

SUMMARY OF THE INVENTION

This invention relates to a system for metering the amount of radiation which is delivered to a target area of a subject by means of a radiation source which is movable along a particular path with respect to the subject. In the preferred embodiment of this invention, the path of motion of the radiation source is along a circular or arcuate course. The system incorporates drive means for propelling the source along its path at a controllable speed. Also included is a sensor for generating a signal indicative of the position of the source along the path. Additionally, the apparatus included within the system comprises a counter which emits a signal whenever the position of the source changes by a predetermined amount, this amount being 2° in one preferred embodiment.

The radiation source is provided with an ionization chamber in the path of emitted radiation, along with associated circuitry to render the chamber an accurate sensor of the amount of radiation passing from the source toward the subject. The circuitry generates a signal corresponding to the amount of sensed radiation.

A counter cumulatively records the sensed radiation. Means is provided for independently presetting a signal corresponding to a particular given maximum radiation which is desired to be permitted during the traversal by the source of any one increment of motion.

This signal, and the signal representing the amount of radiation sensed by the ionization chamber, are brought together in a comparator. The comparator is designed to emit a stop signal whenever the total amount of radiation accumulating during any given increment equals or exceeds the value of the quantity of radiation which is independently presented as indicated above. The stop signal turns off the source. The counter of radiation, which is connected to the radiation sensor, is reset by the occurrence of the stop signal. Thus, the counter reinitiates the count every time the source completes the generation of its predetermined maximum radiation for one increment.

The disablement of the source continues until it has completed its traversal through that particular increment of motion for which the radiation had been counted, and during which the predetermined amount of radiation had been delivered.

The inherent consequence of this configuration of apparatus and circuitry is that, for any given increment of motion, there is established a predetermined maximum value of radiation which substantially cannot be exceeded during any of the increments of motion.

When the source begins to traverse a subsequent increment of motion, it is reactuated to begin delivering radiation toward the subject once more.

Note that, as mentioned above, the counter itself is reset to zero upon the issuance of the stop signal from the comparator which effects the disablement of the source when the radiation for the particular increment being traversed equals or exceeds the predetermined value which is preset. The reason for this is to enable the counter to correctly record the incidence of any spurious or accidental radiation which may be emitted by the source. The occurrence of any such radiation is thus taken into account in governing the amount of radiation administered in the succeeding increment of motion. Thus, this system possesses the flexibility of compensating for inaccuracies in the control of the source itself.

The system, as can be seen, measures the amount of radiation delivered to the subject during each and every increment of motion and limits that amount to a prespecified maximum. The total amount of radiation delivered can thus be limited very precisely. Additionally, the system maintains uniformity in the delivery of radiation from various directions as the source moves along its path of motion.

Several interlocks are built into the system of this invention in order to provide an indication when a basic malfunction occurs, and to, where warranted, disable the radiation delivery apparatus. For example, a special counter is provided which is actuated only during those periods in which the radiation source has been theoretically disabled by the stop signal from the comparator. This counter is programmed such that it emits a signal when a predetermined amount of radiation escapes from the radiation source during a time when it is supposedly turned off. If such a condition occurs, a fault signal is generated, which disables the entire system by cutting off the power supply.

A second interlock senses the time required for the source to traverse a particular increment of motion. If the time required for such traversal is excessive, a similar fault signal is generated.

Two other types of interlocks generate a fault signal if it appears that the radiation administered during an increment is less or more than the desired amount.

Note that, in the utilization of this system, the output dose rate of the radiation source is normally at a rate which, if the source were allowed to traverse its entire course or path in the activated state, would result in an overdose of radiation. Since the system of this invention has the flexibility of interrupting the dosage of radiation whenever the dosage given in any one increment is sufficient, it is possible to assure in this way that the dosage given over the entire path will cumulatively be sufficient. At the same time the system permits selection of traversal speed and/or dose rate of the source so that the desired dose per increment can be administered over almost the entire path of each increment.

DESCRIPTION OF THE PREFERRED EMBODIMENT

Figure 1:
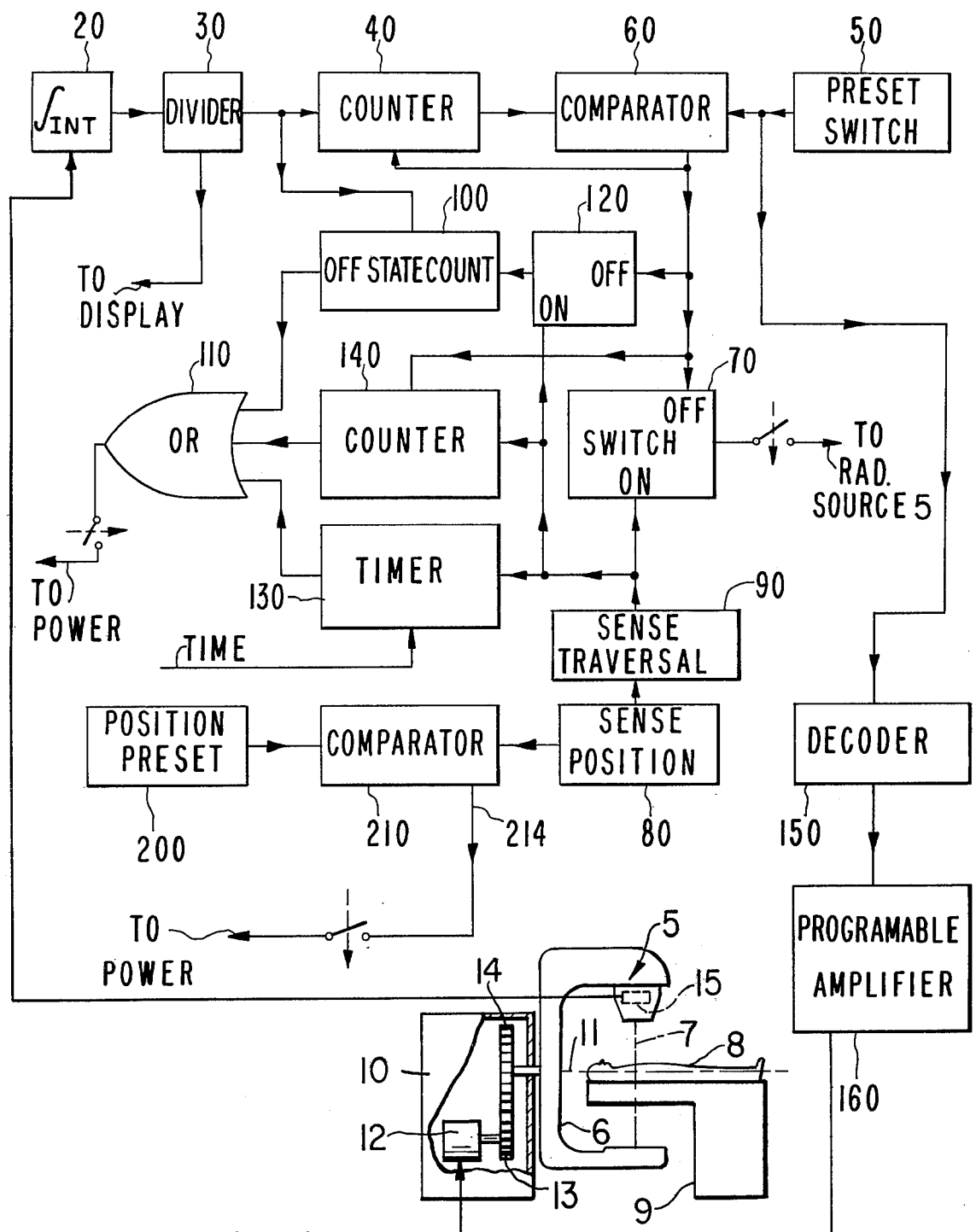
FIG. 1 is a block schematic diagram illustrating the components of the system of this invention.

FIG. 1 enables a concise understanding of the system of this invention. A conventional radiation source 5 is mounted on the arm of a U-shaped member 6 and delivers X-rays along an axis 7 toward a subject or patient 8 positioned on a couch 9. The U-shaped support including source 5 is mounted on a housing 10 for rotation about an axis 11. Drive means such as a variable speed motor 12 and gears 13 and 14 drive the source for rotation about axis 11. The X-ray beam emerging from the source passes through a convention ionization chamber or radiation sensor 15. Integrator 20 emits a digital signal which is proportional to the quantity of radiation delivered by the source 5. Integrator 20 receives its input from the ionization chamber (radiation sensor) 15 located in the path of radiation from the source 5. The ionization chamber 15 contains a gas such as air which ionizes in the presence of radiation incident thereon such that electrodes positioned in the chamber and connected together through a load develop a current flowing between them which is a function of the radiation incident upon the chamber. The current from said electrodes is delivered to integrator 20. The particular structure of integrator 20 and ionization chamber 15 does not constitute a part of this invention, and hence is not described in greater detail.

The signal from integrator 20 passes to divider 30. Integrator 20 emits a signal which indicates units of decirads in a preferred embodiment. As will be explained hereinbelow, the motion of the source will be calibrated in two degree increments in a preferred embodiment. Therefore, in order to derive a signal from divider 30 which is indicative of the radiation delivered per degree of arc, divider 30 produces an output signal at one output which is divided by two. Obviously, if motion of the source 5 is calibrated in one degree increments, the output signal would not be divided by two. The signal which is divided by two is input to counter 40, which will be described below.

A second output of divider 30 produces a signal which is divided by a factor of 10, and presented as an input to a display apparatus associated with the main console (not shown) within view of the operator of the system, in order to present an instantaneous viewing of the quantity of radiation having been administered in rads.

The signal corresponding to the amount of radiation accumulated (divided by two) is input to counter 40. Counter 40 stores this integrated amount of radiation as it accumulates.

Presetting switch 50 is adapted to generate a radiation limit signal which is a function of a quantity of radiation which may be manually preset into presetting switch 50. The format of the radiation limit signal thereby generated corresponds to the format in which the accumulated radiation signal is stored in counter 40; that is, decirads desired per one degree increment.

The accumulated radiation signal and the radiation limit signal are each directed as inputs to comparator 60. Comparator 60 produces an output signal whenever the stored radiation signal in counter 40 equals or exceeds the radiation limit signal input from presetting switch 50.

This stop signal is input to switch 70. Switch 70 is connected to the radiation source in such a way that it is responsive to the occurrence of the stop signal from comparator 60 to disable the source to prevent it from emitting any further radiation.

The radiation source 5, together with the other apparatus, such as counterweights, which are movable therewith, form the U-shaped member 6 and are commonly known as the gantry of the radiation system. For example, see U.S. Pat. No. 3,720,817. The U-shaped member of gantry 6 is provided with position sensor 80, which is connected thereto, and which produces a signal which is a function of the rotational position of the gantry. This position signal is directed as an input to traversal sensor 90. Traversal sensor 90 produces an output pulse whenever the gantry rotates through a two degree increment. The signal output from traversal sensor 90 represents an enabling signal directed to switch 70. The occurrence of this enabling signal resets switch 70 such that the radiation source is re-enabled to begin once more to emit radiation.

Comparator 60 is connected to counter 40 such that the occurrence of the stop signal produced by the comparator, in addition to disabling the radiation source, also resets counter 40 to zero to begin cumulatively counting the radiation which is delivered by the source toward the subject.

It is thus evident that this system limits the amount of radiation delivered by the source toward the subject during each two degree increment of rotation of the gantry to that quantity of radiation which is preset into presetting switch 50. When that quantity is reached during any two degree increment, comparator 60 actuates switch 70 to turn off the radiation source. The radiation source remains in the off state until it is turned on again by the passage of the gantry into a subsequent two degree increment of rotation, at which point the source is reactuated.

As noted above, the occurrence of the stop signal from comparator 60 resets counter 40. This can occur before the end of the traversal of the gantry over a particular two degree increment. Thus, counter 40 can cumulatively count radiation which may occur after the radiation source is supposedly turned to the off state by the stop signal. The reason for this is that integrator 20 does not produce a signal corresponding to the amount of radiation instantaneously with the occurrence of that radiation. Thus, even though the source may be turned off, there will be registered at the output of integrator 20 additional radiation shortly after the instant at which the source is turned off. It is clearly desirable to incorporate this delayed count of additional radiation in order to precisely control the quantity of radiation incident on the subject.

Several interlocks are provided in the system of this invention for indicating various types of malfunctions of the system or of the associated apparatus.

The first of these interlocks comprises an additional counting means 100. Counter 100 receives the same input of accumulated radiation which is delivered to counter 40. Alternatively, as a double check, counter 100 can be fed with a divided signal from an independent integrator which receives its input from additional electrode means in the ionization chamber. In either case, counter 100 is actuated to record its count only when the radiation source is programmed by the stop signal to be in its off state. Counter 100 senses that the radiation source is in its off state by means of switch 120, switch 120 being responsive to the stop signal to emit an off signal which is input to counter 100 to enable it to count. Counter 100 is reset to zero when traversal sensor 90 signals that two degrees of rotation have been completed, at which time the source is reactivated.

Counter 100 is programmed to emit a fault signal if, during the off state of the radiation source, a predetermined amount of radiation is detected and counted at counter 100. This fault signal is delivered as an input to OR gate 110. OR gate 110, in response to the input of a fault signal from counter 100, produces an output signal which is directed to a supplemental disabling means for the radiation source. In this preferred embodiment, that supplemental disabling means comprises a means responsive to an output from OR gate 110 to cut off the entire high power supply from the entire system, and thus deactivate the radiation source and the gantry drive motor. Low voltage to controls and monitoring devices remains on. When the high voltage system thus shuts down, the subject is protected from additional radiation, and the operator is free to correct the difficulty and restart the system.

A second fault interlock comprises timer 130. Timer 130 is connected to receive the pulses generated by traversal sensor 90 whenever the gantry moves through one two-degree increment of rotation. Timer 130 is programmed to emit an output fault signal to OR gate 110 whenever the gantry fails to traverse one of the two degree increments within a predetermined amount of time. In this preferred embodiment, the maximum time permitted for traversal of a two degree increment is 0.08 minutes. If the gantry fails to make that traversal in the prespecified time period, the output signal from timer 130 causes OR gate 110 to deactivate the entire high voltage system in the manner described above.

Still another interlock is provided by counter means 140. Counter means 140 also receives the output of traversal sensor 90. Counter means 140 is programmed to count the number of pulses from traversal sensor 90 occurring before the receipt of a stop signal from comparator 60. If two pulses, indicating traversal of a two degree increment, are received from traversal sensor 90 before the occurrence of a stop signal from comparator 60, this indicates that the full dose of prescribed radiation has not been delivered during the time in which the gantry traverses a particular two degree increment of rotation. This condition, indicating a fault, induces counter 140 to deliver a fault signal to OR gate 110, which in response to that fault signal disables the entire high voltage system in the manner described above.

Decoder means 150 receives its input from presetting switch 50. The signal from presetting switch 50, it will be recalled, is a function of the predetermined maximum degree of radiation which is permitted within any one degree increment of gantry rotation. It can be seen that, in instances where the predetermined maximum radiation is relatively low, it is desirable to provide for relatively rapid gantry rotation, in order that the delivery of radiation to the subject may be accomplished quickly, and that the entire dosage, even though small, may be distributed about as large a rotational displacement as possible and still be applied throughout substantially the entire distance of each two degree increment. Conversely, with larger doses of radiation, slower gantry rotation is required for a given output of the radiation source.

In order to accomplish this, decoder 150 generates a speed control signal at its output which is a function having a roughly inverse relation to the radiation limit signal produced by presetting switch 50. This speed control signal is directed to a programmable amplifier 160 whose output controls the variable speed gantry drive motor 12. The precise form of the speed control apparatus responsive to the speed control signal to determine the speed of gantry rotation is a matter of choice for one skilled in the art.

This system is also provided with a position limit preset switch 200. Position limit switch 200 is manually adjustable to generate a position limit signal at its output. The position limit signal is generated in a format analogous to the format of the position signal which is generated by position sensor 80 and which is a function of the actual gantry position. The position signal and the position limit signal are both presented as inputs to comparator 210.

Comparator 210 emits an output signal when the position signal becomes equal to or greater than the position limit signal generated by position limit switch 200. Thus, a predetermined gantry angle can be manually programmed into position preset switch 200, and comparator 210 will produce an output whenever the gantry angle of rotation actually equals or exceeds that value.

The occurrence of the output signal from comparator 210 may be connected to switch 70, in order to disable the radiation source as soon as the gantry angle becomes equal to the predetermined angle. The output signal from comparator 210 may also be employed by directing it to the gantry drive means, to physically stop the rotation of the gantry when the preset position limit is reached, or to the high voltage supply.

Figure 2:
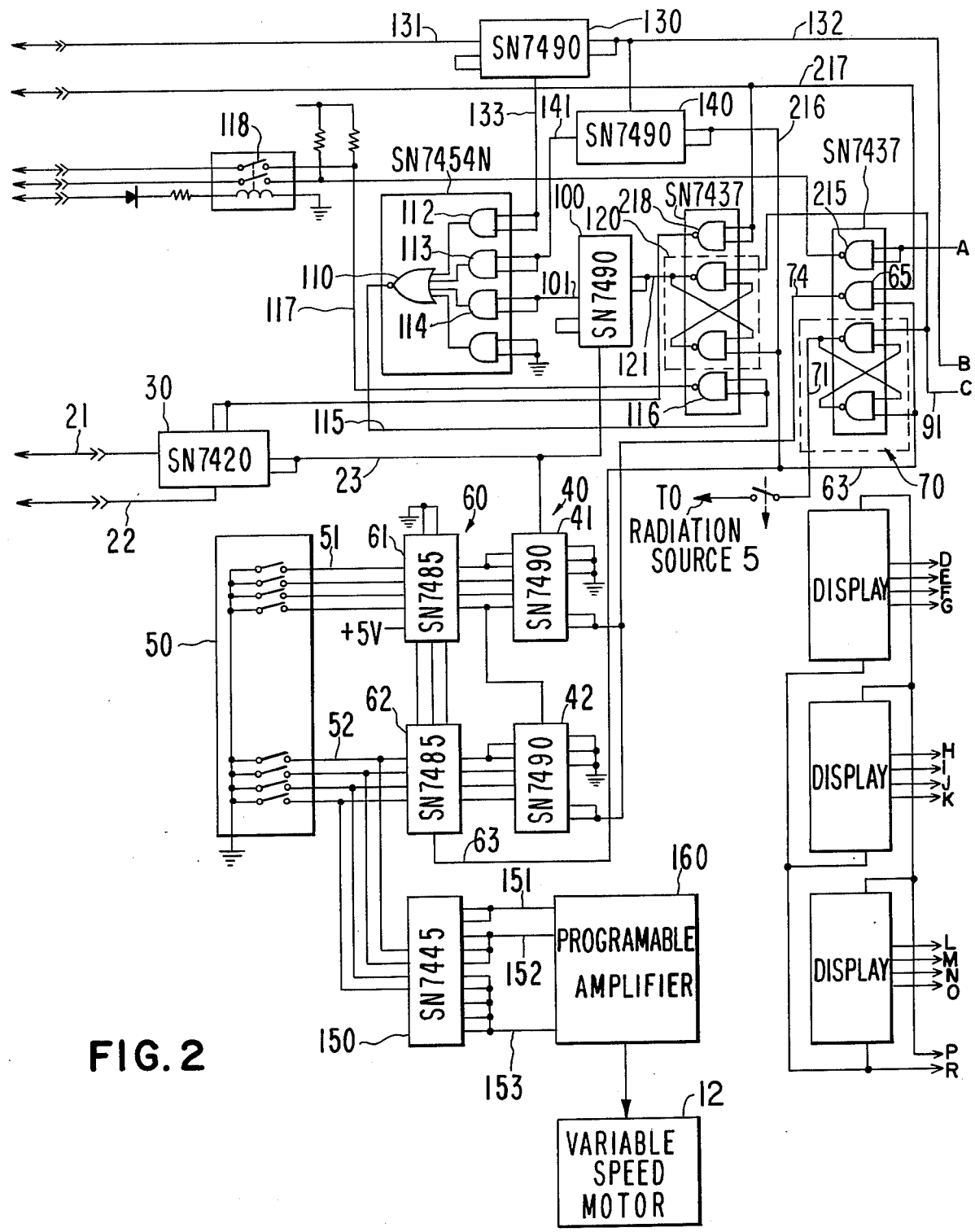
FIG. 2 is a portion of the schematic diagram illustrating in greater detail the components of the system of this invention.
Figure 3:
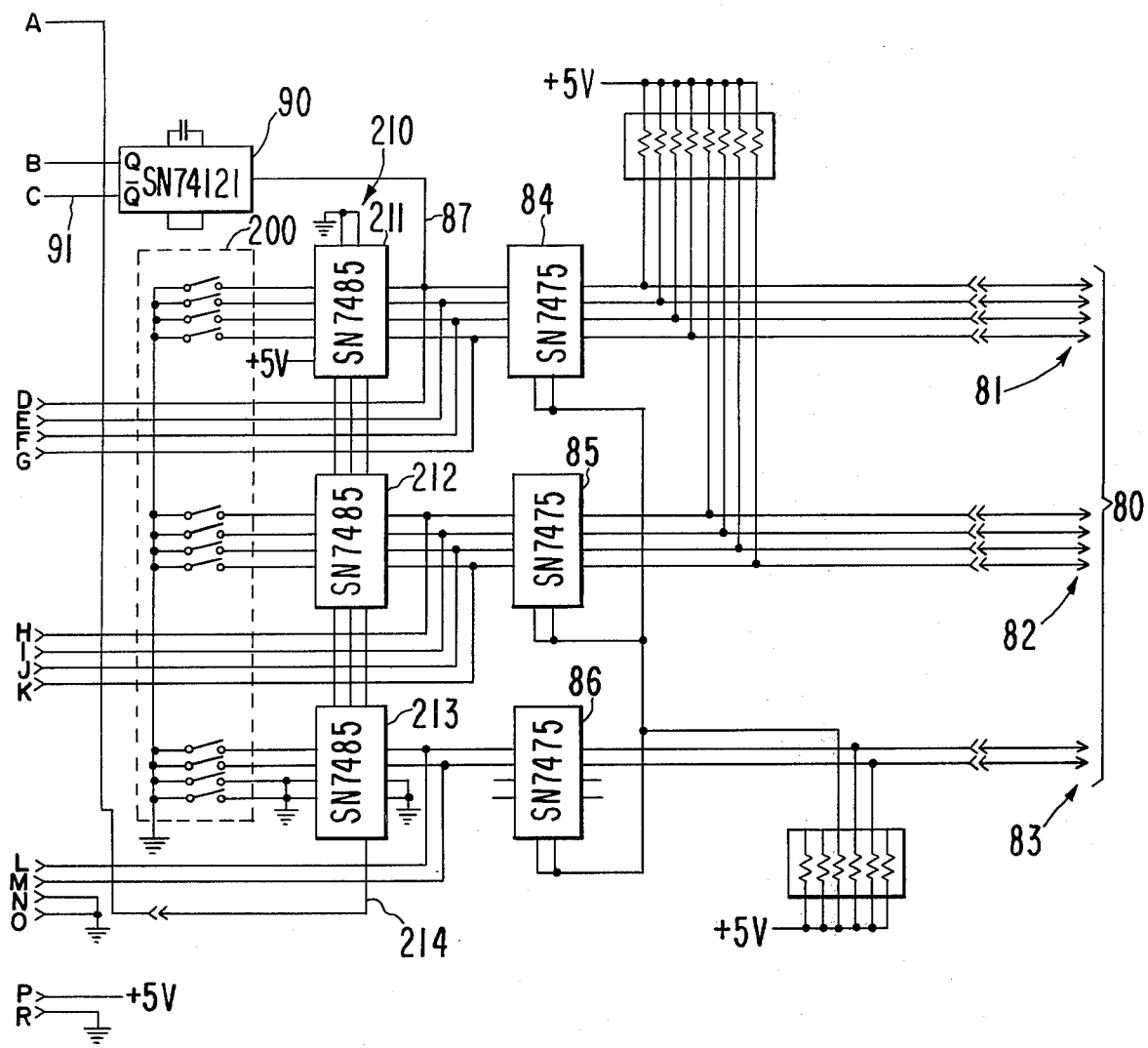
FIG. 3 is another portion of the schematic diagram showing in detailed fashion the elements of the invention.

FIGS. 2 and 3 illustrate in schematic form the principal components of the system of this invention. FIGS. 2 and 3 are interconnected as indicated by the lettered lines at the right of FIG. 2 and the left of FIG. 3. More specifically line A of FIG. 2 is connected to line A of FIG. 3, line B is connected to line B, etc. It is noted that many of the components of this specific preferred embodiment are made up, in whole or in part, by integrated circuit elements as shown in FIGS. 2 and 3 as bearing its particular identifying integrated circuit number. These numbers are standardized among those of skill in the art dealing with such integrated circuit components. The drawings do not show more than a schematic rendition of the radiation source and related mechanism for driving the source around a patient couch since these are well known in the art, as shown for example in U.S. Pat. Nos. 3,582,650 and 3,720,817. Although the invention is described for use in treatment of a patient with X-ray radiation, it is useful in applying radiation broadly of any type to achieve treatment in a controlled manner.

Referring now specifically to FIG. 2, the signal generated by integrator 20, representing in digital form the radiation issuing from the radiation source, appears on line 21. Line 21 is directed as an input to divider 30. The output line from divider 30 bearing the signal corresponding to the radiation emanating from the source, divided by ten, appears on line 22, from whence it is directed to the main console of the device (not shown) such that it may be converted to a visual representation of the dosage to be viewed by the operator. The output from divider 30 which represents the amount of radiation dose divided by two appears on line 23. This amount, as noted hereinabove, is the radiation dose in units of decirads divided by two. Divider 30 comprises an integrated circuit element bearing its identifying number as set forth in FIG. 2. Divider 30 resets to zero prior to the start of each treatment in response to a signal delivered through inverter 218 from line 217. The output from divider 30 appearing on line 23 is directed as an input to counter 40. Counter 40 comprises a pair of integrated circuit elements 41 and 42 bearing their identifying numbers as in FIG. 2.

The information appearing on line 23 is in the form of a succession of pulses, each pulse being generated as an additional unit of radiation is accumulated. Counter 40 stores the total accumulated radiationo as a two-digit binary coded decimal (BCD) number. The units digit of this BCD number appears at the four outputs of integrated circuit element 41, and the tens digit appears at the four outputs of integrated circuit element 42.

The total dosage which is desired to be permitted for administration for any one increment of gantry rotation is inserted manually into presetting switch 50. Presetting switch 50 is a two decade BCD complement coded thumbwheel with the common grounded. A two digit BCD number appears at the outputs of presetting switch 50. The format of the output of presetting switch 50 is analogous to that of counter 40. The units digit is represented by the four outputs designated collectively as 51, and the tens digit is represented by the four outputs designated collectively as 52.

Comparator 60 comprises a pair of integrated circuit elements 61 and 62. The identifying numbers for each of these integrated circuit elements is shown in FIG. 2. Outputs 41 and 51 are each directed to integrated circuit element 61, and outputs 42 and 52 are each directed to integrated circuit element 62. Comparator 60 is programmed such that it emits a stop signal on line 63 whenever the accumulated radiation dose as counted on counter 40 equals or exceeds the value of the radiation limit signal which is output from presetting switch 50.

The stop signal on line 63 is input to switch 70, a flip-flop which is connected to turn the radiation source on or off, depending upon its state. When a stop signal occurs a signal appears on line 71, which is an output of switch 70. This signal passes over line 71 to the radiation source. The presence of a signal on line 71 disables the radiation source. Thus it can be seen that, when the radiation counted at counter 40 becomes equal to or greater than the preset radiation limit signal as set on preset switch 50, comparator 60 emits a signal which actuates switch 70 to emit a further signal which is effective to deactivate the radiation source.

When the signal appears from comparator 60 at line 63 and is input to switch 70, the signal is also delivered over line 63 to inverter 65 and then to line 74, which is directed to counter 40. The incidence of a signal on line 74 serves to immediately reset counter 40 such that it can begin counting again and will include any errant or residual radiation which may be detected by integrator 20. Line 217 enables inverter 65 to connect lines 63 and 74 when the system is in the incremental control mode.

The gantry rotational position is sensed, and delivered in BCD form as a three digit number over input lines designated generally in FIG. 3 as 81, 82 and 83, whence these signals are directed to latches 84, 85 and 86. Note that, since there are only 360° in a full circle, the position of the gantry may be indicated by a four digit binary number representing the units digit, another four digit binary representing the tens digit, and by only a two digit binary number representing the hundreds digit.

The least significant binary digit output from latch 84, indicating a change of one degree in gantry position, is directed over line 87 as an input to traversal sensor 90. Traversal sensor 90 is simply a multivibrator which fires whenever the signal on line 87 changes from negative to positive, thus giving a pulse every two degrees.

Thus, the output of a signal from multivibrator traversal sensor 90 indicates that the gantry has traversed a two degree increment in its path about the subject. This output signal from traversal sensor 90 is directed over line 91 to flip-flop switch 70. The occurrence of the output on line 91 resets switch 70 such that the condition on line 71 changes, reenabling the radiation source to again commence administering radiation.

It is therefore apparent that the radiation source will deliver radiation during any particular two degree increment of rotation up to and including the predetermined maximum radiation dose per increment of rotation. At that time the radiation source is turned off. The radiation source remains off until the gantry has completed that particular two degree rotational increment, at which time the radiation source is again turned on by traversal sensor 90.

The stop signal generated by comparator 60 to turn off the radiation source is also delivered from line 63 to an input of switch 120, which is also a flip-flop. When this occurs, an output signal appears on line 121, from which it is delivered to an input of counter 100. The occurrence of the signal on line 121 enables counter 100 to count any radiation which is received over line 23, the radiation being delivered to counter 100 through input line 23. Counter 100, an integrated circuit element bearing its identifying number in FIG. 2, is connected such that it emits an output signal on line 101 whenever the amount of radiation detected by way of line 23 exceeds a predetermined value during the enablement of counter 100 over line 121. This condition corresponds to there being excessive radiation from the radiation source notwithstanding that it has been turned off by switch 70.

When an output occurs on line 101, AND gate 114 becomes enabled, emitting an output which is transmitted as an input to OR gate 110. When this occurs, OR gate 110 generates an output on line 115 which is inverted by inverter 116 to produce an output over line 117 which is directed through normally closed relay 118 to a cutoff mechanism (not shown) for disabling the entire high voltage system by shutting off the power.

It is evident then that counter 100, when enabled by the disablement of the radiation source, responds to the presence of a predetermined amount of radiation dosage during that off state to deliver a fault signal which shuts down the entire high voltage system in order that diagnosis and repair may be made to effect proper operation of the system.

Still another fault detection and interlock feature is provided by timer 130. Timer 130 is an integrated circuit element which in actuality is a counter similar to the other counters. A signal relating to time is input to timer 130 over line 131. Another input line 132 to timer 130 bears the output signal from traversal sensor 90 indicating whenever the gantry begins movement through another two degree arc increment. The connections to timer 130 enable it to produce an output on line 133 in response to the absence of an output from traversal sensor 90 for a predetermined amount of time. Such a condition might possibly represent a breakdown in the gantry drive means, which naturally requires immediate attention on the part of the operator. Where the gantry is moving too slowly and does not traverse a two degree increment in the predetermined time, the output on line 133 enables AND gate 112 to produce an output which is input to OR gate 110. In response to this condition, OR gate 110 generates a fault signal which deactuates the entire high voltage system in the manner described hereinabove.

Counter 140 also receives as an input the output of traversal sensor 90 appearing on line 132. Additionally, another input to counter 140 is the signal appearing on line 63 from comparator 60. Counter 140 counts the degree changes emanating from traversal sensor 90, and resets when the signal indicating fulfillment of the prescribed dose for a rotational increment appears on line 63. If there are two signals from sensor 90, indicating gantry traversal of two degrees, before the appearance of the signal on line 63, counter 140 generates an output on line 141. This output indicates that less than the desired dosage was given in the particular two degree increment. Such an output enables AND gate 113, which in turn actuates OR gate 110 to produce a fault signal on line 115 which shuts down the entire high voltage system in the manner described above.

Components of the system for controlling the ultimate degree of rotation of the gantry, or source, will not be discussed. In partial fulfillment of this purpose, position limit switch 200 is provided. This is a three digit switch which may be manually set such as by a thumbwheel, and which expresses in BCD form a three digit number corresponding to the ultimate angle of rotation desired for the gantry. This position limit signal corresponds in format to the position signal which appears at latches 84–86. The corresponding portions of the position limit signal and the position signal are applied to integrated circuit elements 211–213 of comparator 210.

When the angle represented by the position signal equals or exceeds the position limit signal angle, comparator 210 produces an output at line 214. Line 214 in response to a signal thereon delivers the signal to inverter 215 which in turn produces an output on line 216 which is directed to the power cutoff means to shut down the high voltage system. Thus, when the gantry has executed its full rotational arc, as programmed on position limit switch 200, the high voltage system is automatically shut down.

As explained above, the desired speed of gantry rotation is to some degree a function of the prescribed radiation dosage for each increment of gantry rotation. In order to accomplish this speed control, decoder 150 is provided. Decoder 150 is an integrated circuit element bearing the number set forth in FIG. 2.

The input to decoder 150 is a four digit binary number directed thereto from output terminals 52 of radiation limit preset switch 50. This output, it will be recalled, is the most significant digit of the prescribed preset radiation limit of dose. The magnitude of this most significant digit may thus be sampled as a rough indication of the desired speed of the gantry rotation.

Decoder 150 serves to convert the binary number (which is a BCD digit) to decade form. Decoder 150 has three outputs 151, 152 and 153. Each of outputs 151–153 corresponds to a predetermined plurality of discrete magnitudes of the number which is input to decoder 150 in BCD form. For example, if the digit input to decoder 150 is a decimal 1 or 2, a signal appears at output 151. If the number is a decimal 3,4 or 5, an output appears on 5, and output appears on 152. If the number is a 6, 7, 8 or 9, an output appears at terminal 153. The presence or absence of a signal at each of outputs 151–153 may be employed in any of a number of ways by those skilled in the art in order to effect speed control of the gantry motor, said speed control being a function of the decimal equivalent of the binary coded decimal number input to decoder 150.

Figure 4:
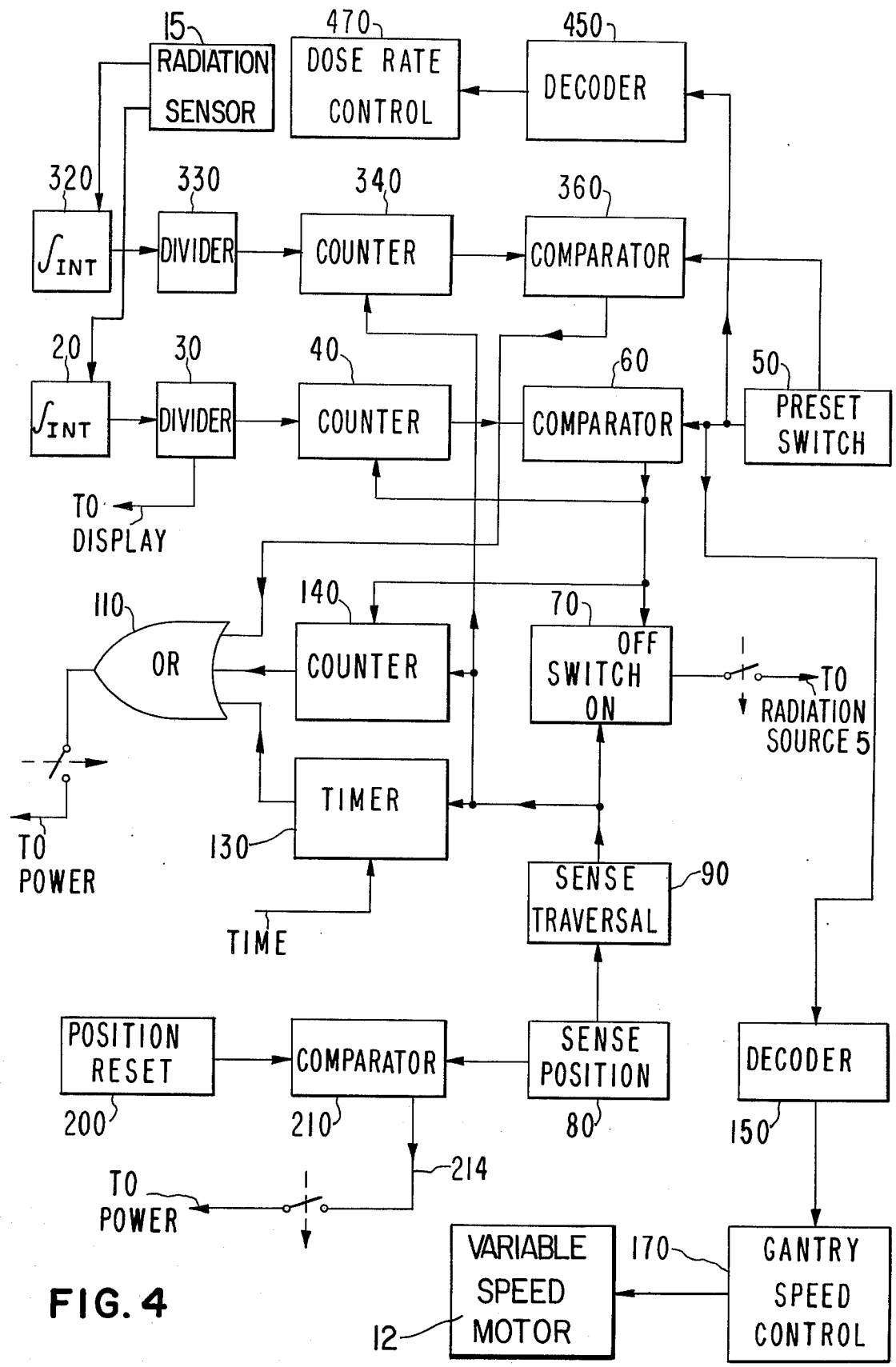
FIG. 4 is a block diagram disclosing a further embodiment of the invention.

FIG. 4 discloses another embodiment in which the off-state interlock is replaced by another type of interlock, and in which the dose rate from the source is controlled. The remainder of FIG. 4 is the same as FIG. 1.

The other interlock in FIG. 4 comprises an additional integrator 320, divider 330, counter 340 and comparator 360. Integrator 320 is the same as integrator 20 except that it is preferably fed by separate electrode means in the ionization chamber 15. Divider 330 is the same as divider 30 and divides the desired output of integrator 320 by the selected traversal increment; for example, divided by two when the selected increment is two degrees. Comparator 360 compares the count from preset switch 50 and counter 340.

The purpose of the interlock is to turn off the entire high voltage power supply in the event that there is a fault anywhere in the line from the ionization chamber through any of the components which deliver the radiation count to comparator 60 so that comparator 60 does not cause deactivation of the radiation source 5 when the delivered radiation reaches the predetermined level set in presetting switch 50. Accordingly, counter 340 separately counts the radiation delivered over the selected traversal increment such as two degrees and if it equals or exceeds a set amount, comparator 360 signals shut down of the entire high voltage power supply through OR gate 110. Preferably the selection of the count limit for counter 340 is arranged to provide a slight tolerance so that the power is not shut off if the dose delivered before switch 70 signals deactivation of the source is insignificantly higher than desired. One way to provide the tolerance is to set counter 340 so it does not register the first two counts it receives from divider 330.

In order for counter 340 to check the radiation delivered over each traversal increment, the counter is reset to zero each time the traversal sensor 90 indicates completion of the two degree or other preselected increment. If counter 340 delivers to comparator 360 a count which equals or exceeds the input from preset switch 50 before counter 340 is reset to zero, the comparator signals shut down of the entire high voltage system. Although the fault system of counter 340 is shown in place of the fault system of counter 100, obviously they may both be used.

It will be recalled that in FIG. 1 a gantry speed control is provided so that the total radiation dose can be divided such that radiation from the source is applied over as much as possible of each increment of gantry travel. There are systems in which the number of gantry speeds which can be obtained with accuracy is limited. Also, it is desirable to complete the treatment in the shortest time. In other words a high total dose treatment over a given total degrees of gantry rotation could be shortened by increasing the dose rate of the source. Thus, when the metered radiation system of this invention is used with a radiation source in which the dose rate (rads per unit of time) is adjustable, it is desirable to adjust the dose rate as a function of desired dose per increment of gantry travel as set by preset switch 50. Obviously, the dose rate control can be used without the gantry speed control to provide a measure of flexibility, but the use of both controls provides maximum flexibility.

As shown in FIG. 4, a variable dose rate is incorporated by adding a second decoder 450 which is similar to decoder 150 and is also coupled to preset switch 50. However, the output from decoder 450 is a function having a roughly direct relation to the signal from presetting switch 50. In other words, if it is desired to increase the radiation per increment, it is necessary to increase the dose rate from the source, assuming the gentry speed is not changed or is not changed enough to provide the desired increase in radiation per increment. The output from decoder 450 is delivered to dose rate control 470 and the output from decoder 150 is delivered to gantry speed control 170. The decoders 150 and 450 are set to make the optimum selection of both gantry speed and dose rate as a function of the output of preset switch 50.

For example, in one embodiment there are three motor speeds and four dose rate settings which permit selection of a particular gantry speed and a particular dose rate which will deliver the desired total dose over the desired total path with a minimum of off time for the radiation source between deactivation of radiation when the desired radiation has been delivered in one increment and reactivation of the source at the start of the next increment. In other words, the object is to continue radiation throughout as much as possible of each increment of gantry motion and yet obtain the full dose per increment before the beginning of the next increment.

The detailed schematic for FIG. 4 would be the same as that shown in FIGS. 2 and 3 except for the changes which would be apparent to one skilled in the art from comparison of the block diagrams of FIGS. 1 and 4. However, as regards addition of the dose rate control it should be recalled that the specified embodiment has four dose rates. Thus, while the decoder 450 would be connected to the same four leads from presetting switch 50 as are connected to decoder 150 (FIG. 2), decoder 450 would have four output leads to accommodate the four possible dose rates, as compared to the three outputs from decoder 150.

It is evident from the foregoing disclosure that applicant has designed a system and method whereby great accuracy and flexibility may be attained in the administration of radiation to a subject from a radiation source which is movable about a path relative to the subject. The path may thus be divided into a plurality of predetermined increments and the administration of radiation may be limited to a predetermined maximum during each of the increments. Any errant radiation emanating from the source during its hypothetical off condition may be stored and credited toward the total radiation to be received in the next increment of rotation. Several safety interlocks are provided. An effective and flexible means of controlling gantry rotation and/or dose rate of the source is disclosed.

It is to be understood that the disclosure set forth hereinabove is intended to be illustrative of a preferred embodiment of this invention, and is not to be construed as limiting the invention to that embodiment. One of skill in the relevent art will be able to make certain modifications, alterations and changes to the embodiment set forth herein without departing from the spirit of the invention. For example, the embodiment has been described using two degree increments of arc and employing an integrator which indicates radiation in decirads. These units have been found to be preferred for use in a linear accelerator employing a 35 Mev electron beam. In another accelerator employing an 18 Mev beam, one degree increments, and radiation measurements in centirads, have been found to be preferred. As previously explained, when a one degree increment is selected, the output from the integrator 20 is delivered to counter 40 without being divided by two. Obviously, other similarly compatible units can be employed.

What is claimed is:

1. A system for metering the quantity of radiation of a subject by an apparatus including a radiation source, said system comprising:
   a. means for causing relative movement between the source and the subject along a path;
   b. means for sensing the relative movement along traversal of a plurality of increments of the path;
   c. means for sensing the amount of radiation from the source toward the subject during the traversal of each of said increments;
   d. means connected to said radiation sensing means for cumulatively counting said sensed amount of radiation from the source toward the subject during the traversal of each of said increments and generating a counting signal which is a function of said counted amount of radiation;
   e. presetting means generating a radiation limit signal which is a function of a predetermined quantity of radiation to be delivered during each of said increments;
   f. comparing means connected to said counting and presetting means for producing a stop signal when the amount of radiation counted by said counting means becomes substantially equal to said predetermined amount;
   g. means connected to said comparing means for disabling the source in response to the production of said stop signal;
   h. said traversal sensing means producing an enabling signal in response to traversal of said motion across the initial boundary of each of said increments;
   i. enabling means responsive to the occurrence of said enabling signal for enabling the source to resume emission of radiation;

whereby the amount of radiation delivered to the subject during the traversal of each of said increments is substantially limited to said predetermined amount.

2. The system of claim 1 further comprising counter reset means for resetting said counting means to zero upon the occurrence of said stop signal, whereby any radiation delivered after occurrence of said stop signal is added to the count for the next succeeding increment.

3. The system of claim 1, in which said path is arcuate, and the center of said arcuate path is proximate to the subject.

4. The system of claim 1, further comprising:
   a. supplemental disabling means for disabling the radiation source; and
   b. additional counter means for counting the radiation delivered by the source, said additional counter means being connected to said supplemental disabling means for actuating said supplemental disabling means upon the emission of a predetermined quantity of radiation by the source during the period between said stop signal and said enabling signal.

5. The system of claim 1, further comprising:
   a. supplemental disabling means for disabling the radiation source; and
   b. timer means connected between said traversal sensing means and said supplemental disabling means for actuating said supplemental disabling means for disabling the source contingent on the failure of the source to traverse any said increments of said path within a predetermined time duration.

6. The system of claim 5, wherein:
   a. said path comprises an arc, centered substantially at the location of the subject;

b. said increment comprises two degrees of said arc; and
c. said timer means is responsive to the lapse of 0.08 minutes during which the source traverses said two degree increment to actuate said supplemental disabling means.

7. The system of claim 1, further comprising:
a. supplemental disabling means for disabling the radiation source; and
b. another counter means connected among said comparing means and said means for sensing the traversal of each of said increments and said supplemental disabling means, said another counter means being responsive to the failure of occurrence of said stop signal during the traversal any of said increments to actuate said supplemental disabling means.

8. The system of claim 4, wherein:
said supplemental disabling means comprises cutoff means for interrupting the transmission of high voltage power to said system.

9. The system of claim 5 wherein:
said supplemental disabling means comprises cutoff means for interrupting the transmission of high voltage power to said system.

10. The system of claim 7, wherein:
said supplemental disabling means comprises cutoff means for interrupting the transmission of high voltage power to said system.

11. The system of claim 1, further comprising;
a. speed control means responsive to a speed control signal for governing the speed at which said drive means causes the source to traverse said path, said speed being a function of said speed control signal; and
b. decoder means connected between said presetting means and said speed control means and being responsive to the magnitude of said radiation limit signal for generating said speed control signal as a function of said magnitude.

12. The system of claim 11, wherein said speed control means comprises a programable amplifier.

13. The system of claim 11, wherein the magnitude of said speed control signal is substantially an inverse function of the magnitude of said radiation limit signal.

14. The system of claim 1 further comprising:
a. position sensing means connected to the source for generating a position signal as a function of the position of the source along said path;
b. position preset means for generating a position limit signal which is a function of a predetermined position limit of the source;
c. position comparing means connected between said position sensing means and said position preset means for generating an index signal when the position of the source substantially corresponds with said predetermined position limit.

15. The system of claim 14, further comprising: movement stopping means responsive to the occurrence of said index signal for halting said movement.

16. The system of claim 14, further comprising: means responsive to the occurrence of said index signal for cutting off high voltage power to said system.

17. The system of claim 1, further comprising:
a. additional counter means for counting the radiation from the source; and
b. additional comparing means connected to said presetting means and to said additional counter means for producing a supplemental stop signal if said additional counter means signals the additional comparing means that the radiation delivered for any of said increments is more than was preset in said presetting means; and
c. supplemental disabling means for disabling the radiation source in response to said supplemental stop signal.

18. The system of claim 17 wherein said additional counter means does not count the first two counts it receives for each of said increments.

19. The system of claim 17 further comprising supplemental means for sensing the amount of radiation from the source, and said additional counter means is connected to said supplemental sensing means.

20. The system of claim 1, further comprising:
a. dose rate control means responsive to a dose rate control signal for governing the dose rate delivered by the source; and
b. decoder means connected between said presetting means and said dose rate control means and being responsive to the magnitude of said radiation limit signal as a function of said magnitude.

21. The system of claim 20 wherein the magnitude of said dose rate control signal is substantially an increasing function of the magnitude of said radiation limit signal.

22. A method for metering the quantity of radiation of a subject delivered by means of an apparatus including a radiation source, means being provided for causing relative movement between the source and the subject over a path, said method comprising the steps of:
a. controlledly causing said relative movement along the path;
b. sensing the traversal of a plurality of increments along said path;
c. sensing the amount of radiation emanating from the source toward the subject during the traversal of each of said increments;
d. cumulatively counting said amount of radiation emanated by the source toward the subject during the traversal of each of said increments and generating a counting signal in response thereto, said counting signal being a function of said counted amount of radiation,
e. generating a radiation limit signal which is a function of a predetermined desired quantity of radiation emanated by the source toward the subject during each of said increments;
f. comparing said radiation limit signal with said counting signal and producing a stop signal when the amount of radiation corresponding to the counting signal substantially equals said predetermined quantity of radiation;
g. disabling the source in response to the occurrence of said stop signal;
h. producing an enabling signal in response to the passage of said source across the boundary of each of said increments; and
i. reenabling the source to resume emission of radiation in response to the occurrence of said enabling signal.

23. The method of claim 22 further comprising the step of reinitiating the counting of said radiation emanating from the source toward the subject upon the occurrence of said stop signal, whereby any radiation delivered after occurrence of said stop signal is added to the count for the next succeeding increment.

24. The method of claim 22, wherein the step of causing said relative movement along said path comprises driving said source along an arcuate path having its center located proximate the subject.

25. The method of claim 22, further comprising the steps of:
   a. further sensing the quantity of radiation emanating from the source toward the subject during said period in which the source is disabled;
   b. counting said radiation emanating during the period of disablement; and
   c. actuating a supplemental disabling means for additionally disabling the source upon the emission of a predetermined quantity of radiation by the source during said period of disablement of the source.

26. The method of claim 22, further comprising the step of;
   actuating a supplemental disabling means for disabling the source contingent upon the failure of the source to traverse said increment of said path within a predetermined time duration.

27. The method of claim 26 wherein:
   a. said movement causing step comprises moving the source along an arcuate path centered substantially at the location of the subject;
   b. said increment comprises two degrees of said arc; and
   c. said step of actuating said supplemental disabling means comprises actuating said supplemental disabling means if 0.08 minutes elapse during the traversal by the source of said two degree increment.

28. The method of claim 22, further comprising the steps of:
   a. actuating a supplemental disabling means for disabling the source in response to the failure of occurrence of said stop signal during the traversal by the source of said one increment of motion.

29. The method of claim 22, further comprising the steps of:
   a. generating a speed control signal, said speed control signal being a function of said radiation limit signal; and
   b. controlling the speed of the traversal in response to the value of said speed control signal.

30. The method of claim 22, further comprising the steps of:
   a. generating a position signal, said position signal being a function of the position of movement along said path;
   b. detecting the attainment by said position signal of a predetermined value; and
   c. generating an index signal in response to the detection of the attainment of said predetermined value by the position signal.

31. The method of claim 22 further comprising controlling the dose rate delivered by the source and the speed of movement along the path as a function said radiation limit signal.

32. A method for metering the quantity of radiation of a subject delivered by means of an apparatus including a radiation source, the source being selectively movable relative to the subject over a path, said method comprising the steps of:
   a. controlledly driving the source along the path;
   b. sensing the traversal by the source of at least one increment of the path;
   c. sensing the amount of radiation emanating from the source toward the subject during the traversal of said increment; and
   d. disabling the source from further delivery of radiation in response to the attainment of a predetermined cumulative amount of radiation emanating from the source during the traversal of said increment.

33. A system for metering the quantity of radiation of a subject by an apparatus including a radiation source, the source being selectively movable relative to the subject over a path, said system comprising:
   a. means for driving the source along the path;
   b. means for sensing the traversal by the source of at least one increment of the path;
   c. means for sensing the quantity of radiation emanating from the source toward the subject during the traversal of said increment; and
   d. means responsive to said radiation sensing means for disabling the source in response to the accumulation of a predetermined quantity of radiation emanating from the source toward the subject during the traversal of said increment.

* * * * *